United States Patent
Boyl-Davis et al.

(10) Patent No.: US 7,112,018 B2
(45) Date of Patent: Sep. 26, 2006

(54) AUTOMATIC POSITION-LOCKING TOOL CARRIER APPARATUS AND METHOD

(75) Inventors: Theodore M. Boyl-Davis, Snohomish, WA (US); Ronald W. Outous, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/037,377

(22) Filed: Jan. 19, 2005

(65) Prior Publication Data

US 2006/0159539 A1    Jul. 20, 2006

(51) Int. Cl.
  *B23C 1/20*    (2006.01)
  *B23B 39/00*   (2006.01)
  *H02K 41/00*   (2006.01)
  *E21B 19/00*   (2006.01)

(52) U.S. Cl. .......... 409/178; 408/76; 310/12; 173/32

(58) Field of Classification Search ........ 409/178, 409/219, 235, 108, 109; 408/76, 234; 310/12; 173/32, 31, 37; 83/743, 744, 745
See application file for complete search history.

(56) References Cited

U.S. PATENT DOCUMENTS

| | | | |
|---|---|---|---|
| 2,785,710 A | 3/1957 | Mowery | |
| 3,165,017 A | 1/1965 | Galabert | |
| 3,420,347 A | 1/1969 | Bales | 192/42 |
| 3,752,036 A | 8/1973 | Hicks et al. | |
| 4,131,003 A | 12/1978 | Foster et al. | 72/7 |
| 4,233,749 A | 11/1980 | Coulter et al. | 33/189 |
| 4,315,371 A | 2/1982 | Kotani et al. | 33/1 M |
| 4,419,823 A | 12/1983 | Thorban | 33/1 M |
| 4,435,904 A | 3/1984 | Logan et al. | 33/143 |
| 4,486,957 A | 12/1984 | Otten | 33/438 |
| 4,547,968 A | 10/1985 | Petersen | 33/32 |
| 4,594,791 A | 6/1986 | Brandstetter | 33/503 |
| 4,630,374 A | 12/1986 | Raleigh | 33/1 M |
| 4,652,805 A | 3/1987 | Kohn | 318/628 |
| 4,665,619 A | 5/1987 | Pearl | 33/32.4 |
| 4,682,822 A | 7/1987 | Brecht et al. | 303/20 |
| 4,727,653 A | 3/1988 | Fujitani et al. | 33/503 |
| RE33,254 E | 7/1990 | Brandstetter | 33/503 |

(Continued)

FOREIGN PATENT DOCUMENTS

DE    0418213 A2    8/1990

(Continued)

OTHER PUBLICATIONS

Boeing Frontiers pp. 1-2, Flex-Track: coming down the line.

*Primary Examiner*—Monica Carter
*Assistant Examiner*—Dana Ross
(74) *Attorney, Agent, or Firm*—Baker & Hostetler LLP

(57) ABSTRACT

An automatic position-locking tool carrier apparatus and method include a carriage that rides on a first rail and a second rail translatably connected to the carriage perpendicular to the first rail. Pinion gears that engage with the two rails are attached to the carriage and coupled to position encoders which transmit position signals to a controller. The controller produces control signals to control brake mechanisms coupled to the pinion gears. Translational motion of the carriage and the second rail are limited or prevented when the position of the carriage and the second rail are within predetermined limitations from a predetermined location, fixing the position of an end-effector head attached at one end of the second rail. The carriage and the second rail are propelled by forces external to the system.

25 Claims, 5 Drawing Sheets

U.S. PATENT DOCUMENTS

| | | | |
|---|---|---|---|
| 5,191,717 A | 3/1993 | Fujitani et al. | 33/503 |
| 5,276,970 A | 1/1994 | Wilcox et al. | 33/18.1 |
| 5,383,277 A | 1/1995 | Shimoda et al. | 33/18.1 |
| 5,383,751 A | 1/1995 | Wheetley et al. | 408/1 |
| 5,492,057 A * | 2/1996 | Bornhors et al. | 409/106 |
| 6,019,554 A | 2/2000 | Hong | 409/84 |
| 6,178,608 B1 | 1/2001 | Koch | |
| 6,215,470 B1 | 4/2001 | Rosenberg et al. | 345/156 |
| 6,467,385 B1 | 10/2002 | Buttrick et al. | 83/745 |
| 6,655,019 B1 | 12/2003 | Wuyts | 29/837 |
| 6,704,002 B1 | 3/2004 | Martin et al. | 345/161 |
| 6,843,328 B1 * | 1/2005 | Boyl-Davis et al. | 173/32 |
| 6,926,094 B1 * | 8/2005 | Arntson et al. | 408/76 |
| 2002/0151420 A1 * | 10/2002 | Scott et al. | 409/219 |
| 2003/0116331 A1 | 6/2003 | Boyl-Davis et al. | 173/1 |
| 2004/0090126 A1 * | 5/2004 | Hsu et al. | 409/235 |
| 2004/0262020 A1 | 12/2004 | Arntson et al. | 173/32 |
| 2004/0265076 A1 | 12/2004 | Buttrick, Jr. et al. | 408/1 |
| 2004/0265077 A1 | 12/2004 | Boyl-Davis et al. | 408/1 |
| 2004/0265081 A1 | 12/2004 | Buttrick, Jr. | 408/76 |
| 2005/0265798 A1 * | 12/2005 | Boyl-Davis et al. | 408/76 |

FOREIGN PATENT DOCUMENTS

| | | |
|---|---|---|
| DE | 0418213 A3 | 8/1990 |
| GB | 1111052 A | 4/1968 |
| WO | WO 2005002803 A2 * | 1/2005 |

* cited by examiner

AUTOMATIC POSITION-LOCKING TOOL CARRIER APPARATUS AND METHOD

FIELD OF THE INVENTION

The present invention relates generally to manufacturing tools and automation. More particularly, the present invention relates to rail-mounted automatic position-locking manufacturing tools and processes.

BACKGROUND OF THE INVENTION

Manufacturing operations frequently require repetitive execution of identical or similar tasks. This fact has led to continued efforts to automate manufacturing operations. Much effort has focused on relatively large, stationary automated machines; nevertheless, a need also exists for smaller, lighter-weight, relatively mobile automated manufacturing devices to perform relatively light-duty manufacturing operations.

Accordingly, it is desirable to provide a flexible rail-mounted tool-carrying device that conforms to a contoured workpiece surface, is relatively light-weight and readily attachable to and detachable from the workpiece, can extend beyond the excursion envelope defined by the rail footprint, and is of relatively low complexity, so as to be relatively inexpensive.

SUMMARY OF THE INVENTION

The foregoing needs are met, to a great extent, by the present invention, wherein in one aspect a flexible, rail-mounted, automatic position-locking tool-carrying apparatus and method is provided that in some embodiments conforms to a contoured workpiece surface, is relatively light-weight and readily attachable to and detachable from the workpiece, can extend beyond the excursion envelope defined by the rail footprint, and is of relatively low complexity, so as to be relatively inexpensive.

In accordance with one aspect of the present invention, a device is provided which includes a first rail having a longitudinal axis, a carriage moveably coupled to the first rail to translate in a direction along the longitudinal axis, a first encoder coupled to the carriage to create a first position signal corresponding to a position of the carriage, a first brake mechanism coupled to the carriage and to the first rail to inhibit translation of the carriage, and a controller linked to the first encoder and to the first brake mechanism to control the first brake mechanism in response to the first position signal. This device further includes a plurality of flexible mounts affixed to the carriage to flex relative to the carriage to accommodate bending and twisting of the first rail, wherein the first rail is relatively stiff in bending about a first bending axis and relatively flexible in bending about a second bending axis orthogonal to the first bending axis. The first rail is attached to a workpiece such that the first bending axis is substantially normal to a workpiece surface and the second bending axis is substantially parallel to the workpiece surface.

Further in accordance with this aspect of the present invention, the controller is configured with a data set defining a plurality of predetermined locations where manufacturing processes are to be performed. The controller is configured to control at least the first brake mechanism in order to successively fix the end-effector head in each of the predetermined locations so that the manufacturing processes can be performed.

In accordance with another aspect of the present invention, the device includes a second rail moveably coupled to the carriage to translate with respect to the carriage in a direction of a longitudinal axis of the second rail, a second encoder coupled to the carriage to create a second position signal corresponding to a position of the second rail, and a second brake mechanism coupled to the carriage and to the second rail to inhibit translation of the second rail. In addition, the controller is linked to the second encoder and to the second brake mechanism, and controls the second brake mechanism in response to the second position signal. Also included in the device is an end-effector head attached to the second rail that translates with the second rail in the directions of the longitudinal axes of the first and second rails to carry a tool.

In accordance with yet another aspect of the present invention, a tool carrier is provided, including means for sensing a carriage position on a rail, means for comparing the sensed carriage position to a predetermined position, and means for controlling a brake to substantially stop a carriage in response to the sensed carriage position being the same as the predetermined position.

In accordance with still another aspect of the present invention, a method of positioning a tool carrier is provided, which includes the steps of sensing a carriage position on a rail, comparing the sensed carriage position to a predetermined position, and controlling a brake to substantially stop the carriage in response to the sensed carriage position being the same as the predetermined position. The method of positioning a tool carrier further includes sensing a second rail position with respect to a carriage, comparing the sensed second rail position to a second predetermined position, and controlling a brake to substantially stop the carriage in response to the sensed second rail position being the same as the second predetermined position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment in accordance with the present invention provides a carriage moveably attached to a flexible rail. A position encoder provides a carriage position signal to a controller, which in response controls a brake mechanism to selectively inhibit or prevent movement of the carriage relative to the rail.

In addition, a second rail is moveably mounted to the carriage in an orientation perpendicular to the first rail. A second position encoder provides a second rail position signal to the controller, which in response controls a second brake mechanism to selectively inhibit or prevent motion of the second rail relative to the carriage.

Figure 1:
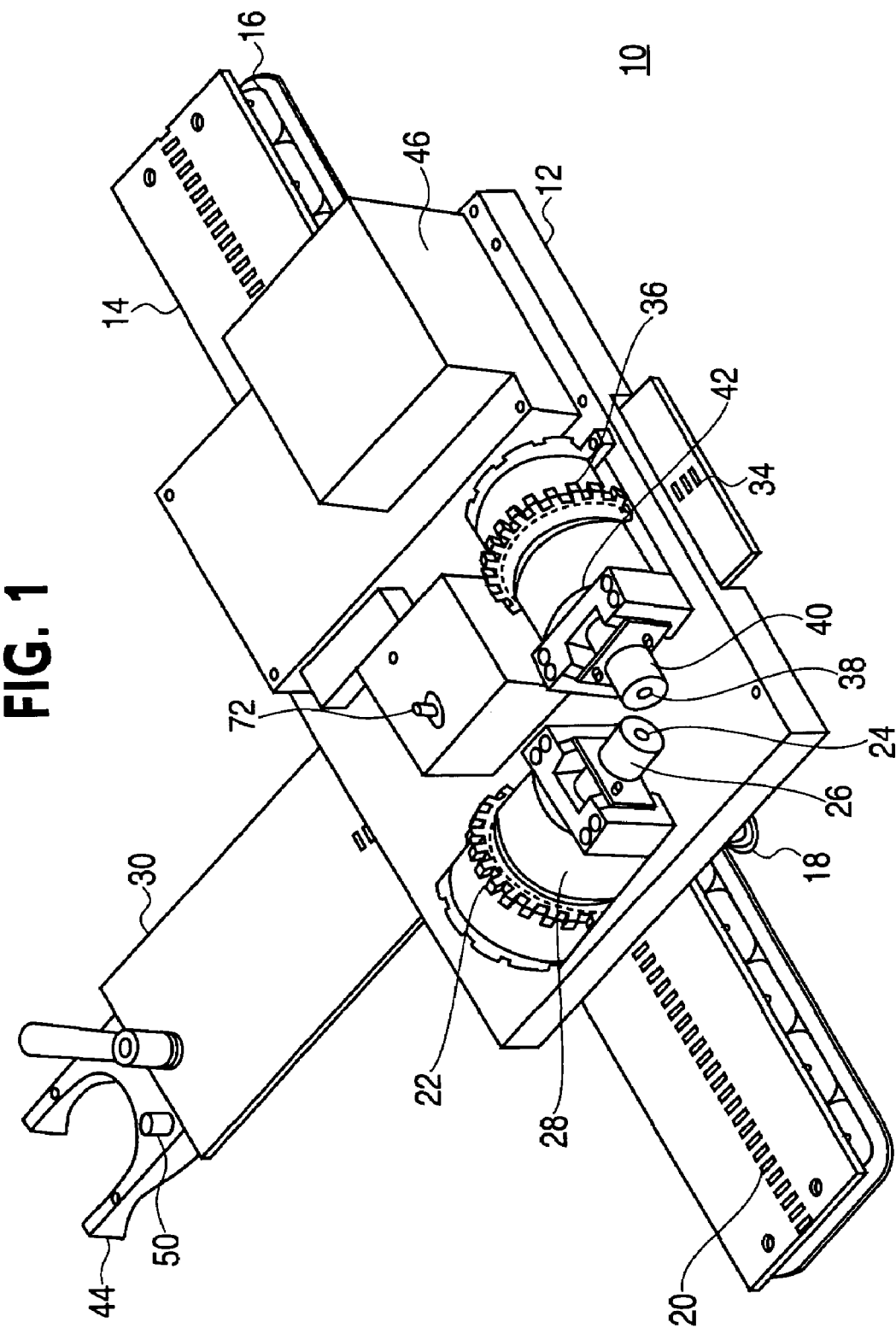
FIG. 1 is a perspective view illustrating a rail-mounted, automatic position-locking tool carrier according to a preferred embodiment of the invention.

A preferred embodiment of the invention will now be described with reference to the drawing figures, in which like reference numerals refer to like parts throughout. An embodiment in accordance with the present invention is illustrated in FIG. 1, which shows an automatic position-locking tool carrier apparatus 10. This embodiment includes a carriage 12, moveably mounted upon a first rail 14, which includes evenly spaced, laterally aligned slots 20 along the longitudinal central axis of the first rail 14. In a preferred embodiment, the first rail has a width substantially greater than its thickness, such that the first rail 14 is resistant to bending about an axis normal to the upper surface of the first rail 14 and relatively flexible in bending about an axis that transverses the width of the first rail 14.

In addition, in a preferred embodiment, a plurality of attachment devices, preferably in the form of vacuum cup assemblies 16, are releasably affixed at spaced intervals along the length of the first rail 14. Nevertheless, in other embodiments the first rail may utilize any suitable attachment means, including common fasteners, such as screws or bolts, clamping devices, magnetic devices, and the like. Thus, in various embodiments, the first rail 14 is releasably attached to the surface of a manufacturing workpiece by way of the vacuum cup assemblies 16, or other such suitable attachment devices.

When thus attached to the surface of a manufacturing workpiece, the upper surface of the first rail 14 is substantially parallel to the surface of the workpiece. The cross-section of the first rail 14 allows substantive bending in the longitudinal direction of the first rail 14, as well as substantive twisting about the longitudinal axis of the first rail. Thus, the first rail is able to flex and twist in order to conform to a contoured surface of the workpiece. The vacuum cup assemblies 16 rigidly fix the position of the first rail 14 with respect to the surface of the workpiece. A similar flexible rail is disclosed in U.S. Patent Application Publication No. US 2003/0116331, the disclosure of which is incorporated by reference in its entirety. A vacuum cup attachment device such as that used in this embodiment is disclosed in U.S. patent application Ser. No. 10/854,209, Boyle-Davis et al., "Conformal Vacuum Cup Apparatus and Method," filed May 27, 2004, the disclosure of which is incorporated by reference in its entirety.

In various embodiments of the invention, the apparatus 10 includes a set of rollers 18 to movably attach the carriage 12 to the first rail 14. The rollers 18 are flexibly mounted on the carriage 12 and engage the first rail 14. The first rail 14 is received between the rollers 18 on the opposite sides of the carriage 12. The first rail 14 preferably has V-shaped edges which are engaged by the rollers 18, which preferably include V-grooves that receive the V-shaped edges of the first rail 14. The rollers 18 thus prevent relative movement between the first rail 14 and the carriage 12 in all directions other than along the longitudinal axis of the first rail 14. A carriage roller system of this type also is disclosed in U.S. Patent Application Publication No. US 2003/0116331 (incorporated by reference above).

An axle 24 is mounted to the carriage 12 and a pinion gear 22 is concentrically attached to one end of the axle 24. The pinion gear 22 extends radially through a slot in the carriage 12 such that the pinion gear 22 teeth engage the slots 20 on the surface of the first rail 14. Thus, as the carriage 12 moves in translation along the first rail 14 in the longitudinal direction, the pinion gear 22 rotates proportionally to the translational movement of the carriage 12, and thereby the axle 24 rotates proportionally to the translational movement of the carriage 12.

Rotary position encoder 26 is also concentrically mounted to the axle 24 in order to encode, that is, to produce a digital electronic signal representative of the rotational, or angular, position of the pinion gear 22, which is proportional to the translational position of the carriage 12 along the longitudinal axis of the first rail 14. This position feedback signal is used in a closed loop control algorithm to determine when the apparatus 10 is approaching a predetermined set point and to produce a control signal in order to selectively actuate the first brake 28. In addition, a brake 28 mechanism also is concentrically attached to the axle 24 in order to provide for selective braking, that is, inhibition or prevention of rotational movement of the axle 24, and thus the pinion gear 22, thereby preventing or inhibiting translational motion of the carriage 12 along the longitudinal axis of the first rail 14.

Another preferred embodiment of the invention includes a second rail 30 movably mounted to the carriage 12, preferably using a set of rollers 18. In a preferred embodiment of the invention, the second rail 30 is constructed in a similar or identical fashion to the first rail 14. The second rail 30 preferably is oriented perpendicular to the first rail 14, with the upper surface of the second rail 30 substantially parallel to the surface of the workpiece. Thus, the longitudinal axis of the two rails 14, 30 correspond to a two-coordinate position system, wherein the longitudinal axis of the first rail 14 runs parallel to the first coordinate axis, or X-axis, and the longitudinal axis of the second rail 30 runs parallel to the second coordinate axis, or Y-axis, of the coordinate system.

A second pinion gear 36 is concentrically attached to a second axle 38, which is mounted to the carriage 12, such that the teeth of the pinion gear 36 engage slots 34 on the second rail 30. The pinion gear 36, and likewise, the axle 38, thus rotates proportionally to the translational motion of the second rail 30 along its longitudinal axis. A second rotary position encoder 40 is also concentrically attached to the second axle 38, proximate to the pinion gear 36, in order to encode, that is, to produce a digital electronic signal representative of the rotational, or angular, position of the pinion gear 36 and the second axle 38. In an alternative embodiment, the first and second encoders 26, 40 are mounted to the carriage 12 and mechanically coupled to the first and second axles 24, 38 by way of a set of pulleys and flexible belts.

A second brake 42 mechanism also is concentrically attached to the second axle 38, in order to provide selective braking, that is, inhibition or prevention of rotational motion of the second axle 38, and thus the pinion gear 36. The braking force of the second brake 42 is translated to the second rail 30 by way of the pinion gear 36, the teeth of which engage with the slots 34 on the second rail 30. In this way the translational motion of the second rail 30 along its longitudinal axis is controlled or limited by actuation of the second brake 42. Examples of brake mechanisms that are compatible with this embodiment include the Type FB power-on electromagnetic brake series produced by Inertia Dynamics, of Connecticut, USA; and the Version 86 111..E00 electromagnetic single-surface brake line produced by Kendrion Binder Magnete GmbH, of Germany. Alternative embodiments of the invention include other types of breaking mechanisms, for example, hydraulic or pneumatic brakes, water brakes, governor-actuated brakes, a force field, or any other motion inhibitor.

In various embodiments of the invention, a manufacturing tool carrier head, or end-effector head 44, is attached at one longitudinal extreme of the second rail 30. Alternative embodiments include multiple end-effector heads, which may be attached at both longitudinal extremes of the second rail 30, or at intermediate positions along the longitudinal axis of the second rail 30. The end-effector head 44 optionally includes an attachment device to hold a manufacturing tool. In a preferred embodiment of the invention, the manufacturing tool attachment device includes a quick disconnect collet. In other preferred embodiments of the invention, the manufacturing tool attachment device may include a pin joint, or a ball joint, or any suitable attachment device capable of attaching a manufacturing tool to the end-effector head 44.

The position feedback signals produced by the first and second encoders 26, 40 are transmitted to a controller 46. In a preferred embodiment of the invention, the controller 46 includes a processor. In other embodiments of the invention, the controller 46 may include any suitable data processing system, such as a personal computer (PC), an application specific integrated circuit (ASIC), a server, a collection of networked servers or PCs, a main frame computer, or any suitable microprocessor-based system capable of receiving and processing the encoder feedback signals. Furthermore, in a preferred embodiment of the invention, the controller is installed on the carriage 12 as an integral part of the automatic position-locking tool carrier apparatus. In other embodiments of the invention, the controller is at a remote location from the automatic position-locking tool carrier apparatus and is linked to the encoders and brakes by conventional electrical connections, or a wireless communication system.

The controller 46 receives the position feedback signals from the two encoders 26, 40 and performs a control algorithm in order to determine the relative positions of the carriage 12 on the first rail 14 and the second rail 30, with respect to a two-coordinate position system, and produce control signals to control, or actuate, the first and second brakes 28, 42. Thus, the automatic position-locking tool carrier apparatus 10 uses a closed loop control system to control or limit movement of the carriage 12 upon the first rail 14 and movement of the second rail 30 upon the carriage 12, ultimately controlling the two-dimensional position of the end-effector head 44.

An alternative embodiment includes a data code strip attached to the surface of the first rail 14 or the second rail 30 that is detectable by the encoders 26, 40. In this embodiment, the position of the carriage 12 relative to the rails 14, 30 is determined based on information recorded on the data code strip. For example, a data code strip may include magnetic or optical information detectable by the encoders 26, 40 to identify the translational position of the carriage 12 or the second rail 30. An advantage of this embodiment is that the controller 46 is able to determine the absolute location of the carrier 12 or second rail 30, rather than the relative position, as is the case with the pinion gear 22, 36.

In the embodiment shown in FIG. 1, the automatic position-locking tool carrier apparatus 10 is moved by an operator or an actuator suitable to apply a force to the apparatus 10. The carriage 12 and the second rail 30, and ultimately the end-effector head 44, are propelled by an external force applied by a prime mover, which is not included in the embodiment. In these embodiments, the external force may be applied by any suitable external force-producing mechanism or means, or prime mover, for example, a hydraulic mechanism, a pneumatic mechanism, an electrical motor, or a human being.

In this embodiment, the automatic position-locking tool carrier apparatus 10 is configured to limit motion of the carriage 12 relative to the rails 14, 30. This type of control system has been referred to as Computer Numerically Limiting (CNL). A controller senses the position of the carriage 12 and the second rail 30, and determines the position of the end-effector head 44. If the position of the end-effector head 44 is not within predetermined limits, the controller releases the brakes 28, 42 allowing free motion of the automatic position-locking tool carrier along both axes.

The carriage is propelled by a force external to the system in either direction along the longitudinal axis of the first rail 14 until the controller 46 senses that the position of the carriage 12 is within predetermined limits along the X-axis, at which time the controller 46 actuates the brake 28 in order to prevent translational motion of the carriage along the first rail 14.

Then, the second rail 30 is propelled along its longitudinal axis by a force external to the system until the controller 46 senses that the second rail 30 position is within predetermined limits, at which time the controller 46 actuates the second brake 42 in order to prevent translational motion of the second rail 30 along its longitudinal axis. With both brakes 28, 42 actuated, the position of the end-effector head 44 is effectively fixed within predetermined X- and Y-coordinate limits, and an attached manufacturing tool may be actuated by an operator or other suitable actuator in order to perform some manufacturing process, such as drilling a hole. When the manufacturing process is completed, the operator presses a command button that sends a command signal to the controller 46, signaling the controller to release the brakes 28, 42 so that the end-effector head 44 may be moved to the next predetermined location.

Figure 2:
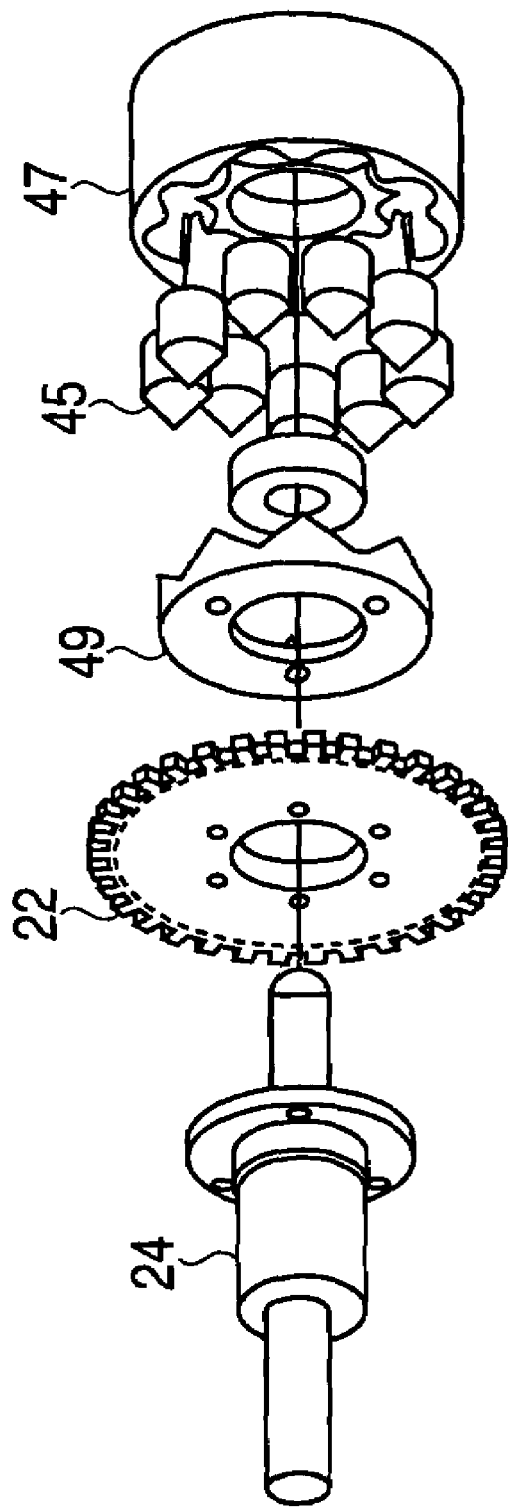
FIG. 2 is a detail perspective view of an air-driven axial piston motor in accordance with an alternative embodiment of the automatic position-locking tool carrier.

In addition, an alternative embodiment of the invention includes an air-driven axial piston motor concentrically attached to each the first and second axles 24, 38. FIG. 2 shows an example of an axial piston motor 48 installed on the first axle 24. The axial piston motor 48 includes a set of axially aligned cylindrical pistons 45 enclosed in a casing 47. The pistons 45 are coupled to a cam 49, which engages the axle 24. Pressurized air is introduced into the motor to force the pistons 45 to reciprocate, applying a torque to the cam 49, which in turn drives the axle 24 in a rotational direction. The axial piston motor 48 thus ultimately applies a force to the carriage 12 by way of the pinion gear 22 to propel the carriage 12. Likewise, an axial piston motor 48 propels the second rail 30.

The example actuator in FIG. 2 is an axial piston motor 48. Nevertheless, other embodiments may include any suitable actuator, such as a pneumatic actuator, a hydraulic actuator, an electromagnetic actuator, or any suitable motor to propel the carriage 12 and the second rail 30.

In another alternative embodiment of the invention, a sensor on the end-effector head 44 detects when the manufacturing process has been completed, for example, when the manufacturing tool has been retracted to its fully retracted or starting position, at which time the controller 46 newly releases both brakes 28, 42 so that the automatic position-locking tool carrier apparatus 10 may be propelled by an external force to a new location. In this manner, the automatic position-locking tool carrier apparatus 10 facilitates multiple repetitive manufacturing processes to be quickly performed with a high degree of accuracy.

In another embodiment of the invention, the controller 46 is programmed to determine the orientation of the first and second rails 14, 30 with respect to a predetermined two-coordinate system. For example, in the embodiment illustrated in FIG. 3, the automatic position-locking tool carrier apparatus 10 includes a teach pin 50 attached to the end-effector head 44 to aid in determining the orientation of the first and second rails 14, 30 with respect to a predetermined two-coordinate system, as follows.

Figure 3:
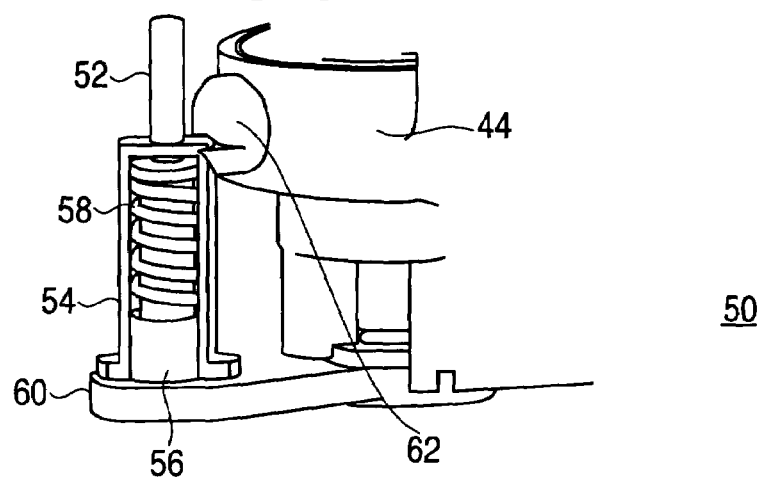
FIG. 3 is a partial cutaway plan view of a retracted teach pin compatible with the automatic position-locking tool carrier of FIG. 1.
Figure 4:
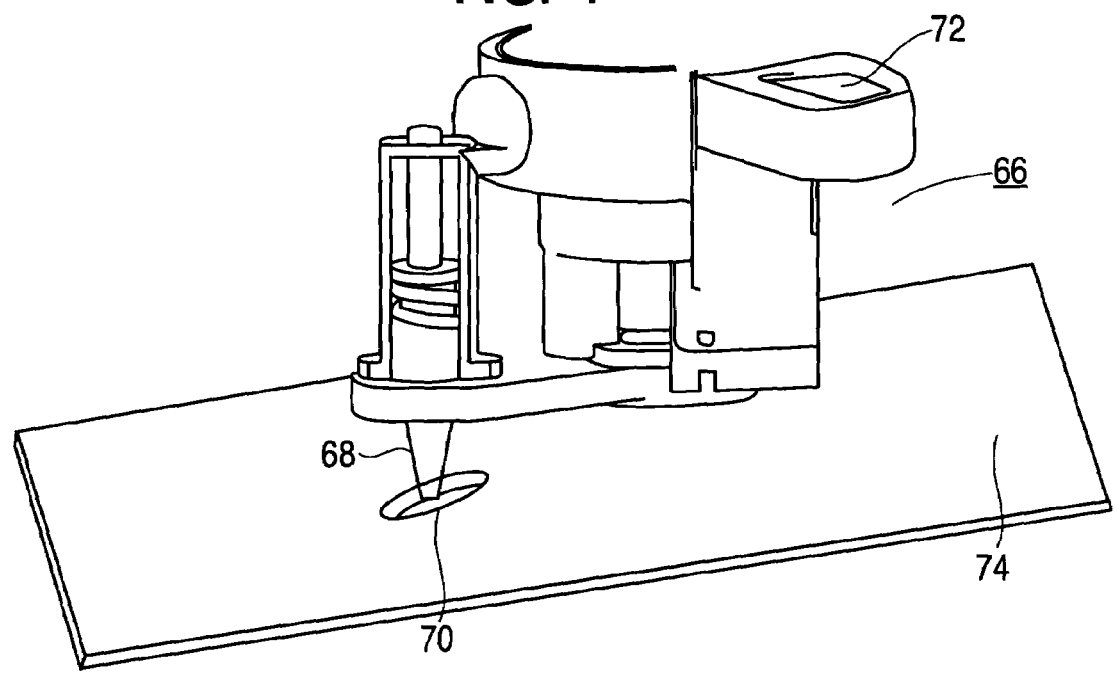
FIG. 4 is a partial cutaway view of the teach pin of FIG. 3 in the extended position.

In a preferred embodiment, the teach pin includes a push rod 52 that extends through one end of a casing 54. The opposite end of the push rod 52 extends through an annular insert 56 enclosed in and radially confined by the casing 54. A spring mechanism 58, preferably a coiled spring, is fixedly attached at one end of the spring 58 to the push rod 52, and is fixed at its other end by insert 56, such that the coiled spring 58 is compressed when the push rod 52 is depressed, as shown in FIG. 3. As the push rod is vertically depressed, a tapered, or conically formed, extension of the push rod 52 extends beyond the lower portion of the casing 54. The casing 54 is attached at its lower end, and near its upper end, the end-effector head 44 by fixed brackets 60 at its lower end and 62 at its upper end.

As it extends, the tapered end 68 of the teach pin 50 engages a preexisting coordination hole in the manufacturing workpiece 74 at a predetermined precision location upon the workpiece 74, and the teach pin is axially centered upon the coordination hole as the push rod 52 is depressed and the tapered end 68 extends into the coordination hole. When the teach pin is precisely centered in the coordination hole, or K-hole, a teach button 72 on the automatic position-locking tool carrier apparatus 10 is manually actuated, producing an electronic teach signal which is transmitted to the controller 46 in order to signal the controller 46 to determine the location of the end-effector head 44. In a preferred embodiment, the controller 46 is programmed so that the teach button function and the command button function are both performed by a single command button.

This process is repeated a second time at a second coordination hole at a predetermined precision location upon the surface of the workpiece 74. Using the X-axis and Y-axis coordinate information regarding each of the two coordination holes, the controller 46 performs an algorithm to determine the precise orientation of the automatic position-locking tool carrier apparatus 10 with respect to the two coordination holes 70. Using a standard polar transformation algorithm, the controller 46 then performs a mathematical calculation to transform, or shift, the two-coordinate system of a predetermined data set defining the precise locations of the manufacturing processes to be performed to match the actual orientation of the automatic position-locking tool carrier apparatus 10 upon the workpiece 74. In this way, the controller 46 is enabled to precisely locate the end-effector head 44 for each manufacturing process defined in a predetermined data set, accounting for the actual orientation of the first rail 14 as attached to the manufacturing workpiece 74.

In another preferred embodiment of the invention, the controller 46 is programmed to compare the sensed distance between the two coordination holes 70 to a list of predetermined unique distances, in order to identify a specific data set among a group of data sets that corresponds to the sensed distance between the coordination holes 70. In this embodiment the automatic position-locking tool carrier apparatus is able to identify the correct set, or pattern, of predefined locations for manufacturing processes corresponding to the coordination holes 70 detected on the workpiece 74.

In yet another preferred embodiment of the invention, the teach pin is equipped with a sensor to sense a vertical position of the teach pin 50, and to send a signal to the controller 46 when the teach pin 50 reaches a predetermined depth to signal the controller 46 to determine the location of the end-effector head 44 at that point. In this embodiment, the teach button function is performed automatically as part of the machine process, eliminating user activation for this function. An alternative embodiment includes a tool position sensor that senses the position of the manufacturing tool connected to the end-effector head 44 and sends a signal to the controller to release the brakes 28, 42 when the manufacturing tool reaches a predetermined position, for example, the fully retracted position, so that the end-effector head 44 may be moved to a new location.

Figure 5:
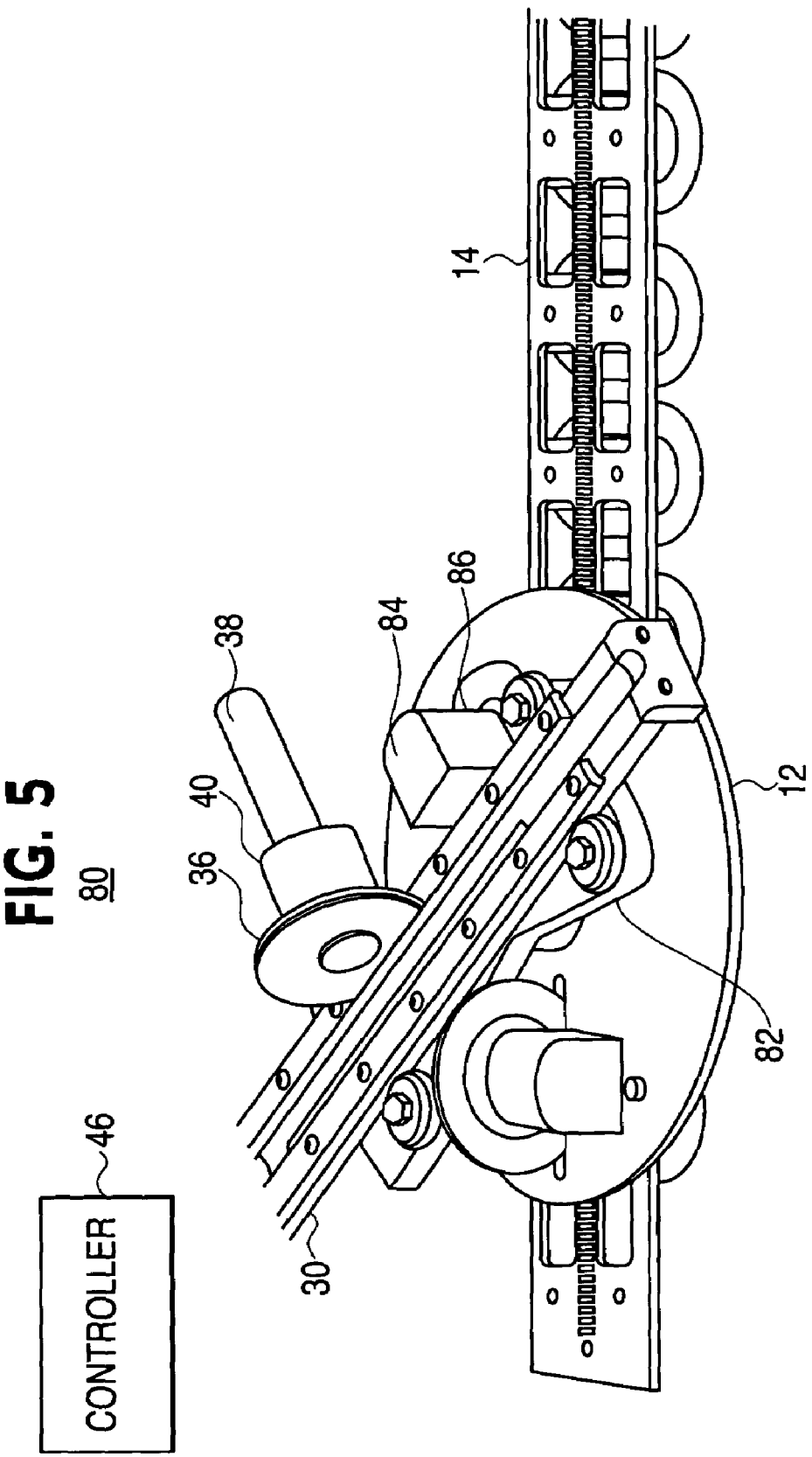
FIG. 5 is a perspective view of a three-axis automatic position-locking tool carrier, in accordance with an alternative embodiment of the invention.

In still another embodiment of the invention, illustrated in FIG. 5, a three-axis automatic position-locking tool carrier apparatus 80 includes a rotatable rail-mount 82 rotatably attached to the carriage 12. In this embodiment, the second rail 30 is movably attached to the rotatable rail-mount 82 such that the second rail 30 may translate along its longitudinal axis with respect to the rotatable rail-mount 82. In this embodiment the carriage 12 translates along the longitudinal axis of the first rail 14, as in the previous embodiments. The rotatable rail-mount 82 rotates with respect to the carriage 12 and the first rail 14, which results in the angle between the first rail 14 and the second rail 30 being variable. A third encoder 84, preferably an angular position encoder, is provided to encode, that is, to produce a digital electronic signal representative of the angular position of the rotatable rail-mount 82 with respect to the carriage 12 and the first rail 14. In addition, a third brake 86 mechanism is attached to the rotatable rail-mount 82 in order to brake, that is, selectively inhibit or prevent angular or rotational motion of the rotatable rail-mount 82 with respect to the carriage 12 and the first rail 14.

As in the previously described embodiments, in this three-axis embodiment 80, the angular position signal is sent from the third encoder 84 to the controller 46, and the controller produces a control signal to actuate the third brake 86. In a preferred embodiment, the third brake 86 is an angular brake. Thus in a three-axis embodiment 80, the carriage 12 translates along the longitudinal axis of the first rail 14, the second rail 30 translates along its longitudinal axis, and a rotatable rail-mount 82 rotates, changing its angular position about an axis normal to the upper surface of the first and second rails 14, 30.

For example, the carriage 12 may be propelled to a position at one extreme of the first rail 14, at which time the controller 46 releases the third brake 86, allowing the rotatable rail-mount 82 to rotate, such that the end-effector 44 attached to the second rail 30 extends beyond the end of the first rail 14. The second rail 30 is extended or retracted and the rotatable rail-mount 82 is rotated until the end-effector head 44 lies within predetermined limits from a predetermined location beyond the end of the first rail 14, where a manufacturing process is to be performed. At this time, the second brake 42 and the third brake 86 are actuated by the controller 46, and the position of the end-effector head 44 is fixed. This configuration allows the three-axis automatic position-locking tool carrier 80 to reach a larger effective area, including corner areas beyond either end of the first rail, and areas on either side of the first rail 14.

An alternative embodiment includes multiple rails in parallel attached to the carriage 12 with multiple end-effector heads 44 to perform multiple manufacturing processes in parallel. Moreover, an additional alternative embodiment on the invention includes multiple carriages 12 installed on the first rail 14 that move independently of each other along the longitudinal axis of the first rail 14. In a preferred embodiment, the controller tracks the position of the multiple carriages 12 in order to maintain a predetermined distance between the multiple carriages 12.

Figure 6:
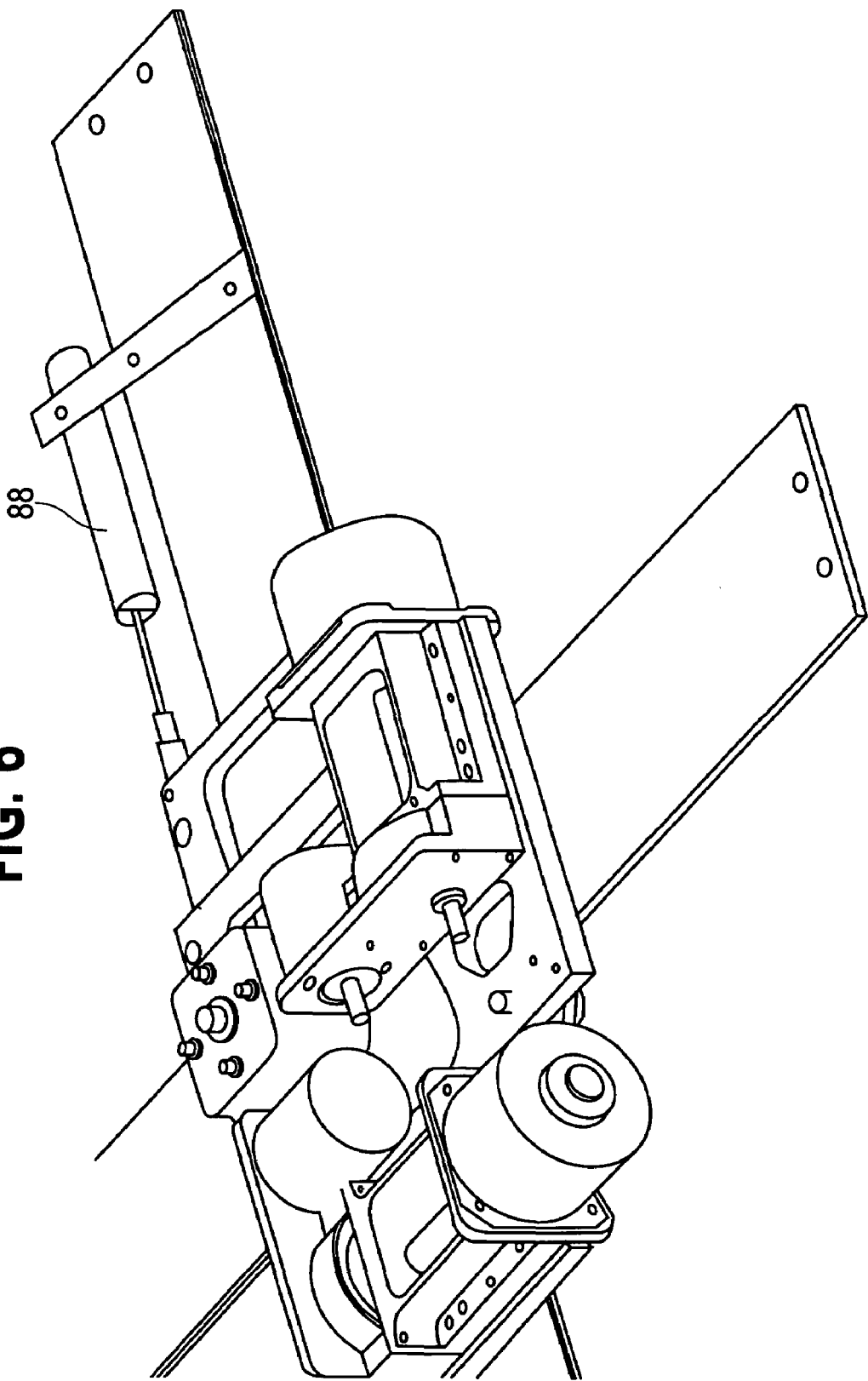
FIG. 6 is a perspective view of an alternative embodiment of the invention including a gravity compensator.

In a preferred embodiment of the invention illustrated in FIG. 6, a gravity compensation device, or gravity compensator, 88, for example, a pneumatic cylinder, is included in order to compensate for positional effects caused by gravitational force. For example, if the first rail 14 is attached to a vertical surface, the attachment devices, for example vacuum cups 16, and the roller 18 engagements, and the second rail 30 deform under stress, such that the relative dimensions of the automatic position-locking tool carrier apparatus slightly vary with the orientation of the apparatus. Controller 46 receives a directional gravitation signal from a gravitational force sensor and creates a control signal to control a gravity compensator 88 that is attached to the first rail 14 and to the carriage 12 in order to adjust the relative position of the carriage 12 with respect to the first rail 14 in order to compensate for deformation of the apparatus in the direction of the longitudinal axis of the first rail 14 caused by gravitational force.

In some embodiments, a second gravity compensation device 88 is attached to the carriage 12 and to the second rail 30 in order to compensate for gravitational force effects in the direction of the longitudinal axis of the second rail 30. Furthermore, in some embodiments the gravity compensation device 88 compensates for the weight of a tool connected to the end-effector head 44. For example, in an embodiment, a pneumatic cylinder connected to the carriage 12 and to the second rail 30 provides power assistance by applying a force equal to the weight of the tool in the direction opposite that of gravity, thus reducing the force required by a prime mover or actuator to move the second rail 30. In other embodiments, the gravity compensation device 88 provides the force required to move the carriage 12 or the second rail 30. Although the example gravity compensation device 88 shown in FIG. 6 is a pneumatic cylinder, other embodiments may include any suitable actuator, for example, a hydraulic actuator, an air-driven axial piston motor, or the like. The air-driven axial piston motor has the advantage that it is capable of providing a constant torque, and a resultant constant force on the second rail, or the carriage, both while in motion and when at rest.

In another preferred embodiment of the invention, the controller 46 is programmed to limit the velocity and acceleration of the carriage 12 and the second rail 30. By limiting the velocity with which the carriage 12 and the second rail 30 are allowed to move, the controller is able to increase the accuracy with which the carriage 12 and the second rail 30 positions are fixed with respect to predetermined limits when the brakes 28, 42 are actuated. In a preferred embodiment, the controller is further programmed to modulate the brake 28, 42 control signals in order to progressively slow or inhibit movement of the carriage 12 and the second rail 30, utilizing multiple bursts of energy to limit deceleration and gradually stop the carriage 12 and the second rail 30 in order to increase the precision of the location at which the end-effector head 44 is eventually fixed.

In yet another embodiment of the invention, the controller 46 is programmed to allow translational motion between two predetermined points during operation of the attached manufacturing tool, and then to allow motion in another direction to a third point, and so on, in order to guide the movement of the end-effector head 44 to facilitate manufacturing processes that require translational motion during operation of the manufacturing tool. For example, a milling tool may be attached to the end-effector head 44, actuated, and then moved through a predetermined sequence of directions while the milling tool is in contact with the workpiece surface, in order to perform a milling operation in a predetermined pattern. As another example, a routing tool may be attached to the end-effector head 44, actuated, and moved while the routing tool is in contact with the workpiece surface in order to perform a routing process in a predetermined form. This semi-automated process has been referred to as simulated motion.

In other embodiments of the invention, an input device is included on the automatic position-locking tool carrier apparatus. In a preferred embodiment, for example, a digital pad is linked to the controller and installed on the carriage 12 so that an operator or user may input control commands. Various other embodiments may include any suitable input device, such as a keyboard or a pointing device, or the like. Additionally, the automatic position-locking tool carrier may include visual indicators, for example, light emitting diodes (LEDs), or an auditory device to indicate the direction to the next location to which the tool carrier is to be moved. Still other embodiments may include a visual display screen, such as a liquid crystal display (LCD) screen in order to communicate information to an operator or user. Other embodiments may include any suitable user interface, including, for example, a graphical user interface (GUI).

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device, comprising:
   a first rail having a longitudinal axis;
   a carriage moveably coupled to the first rail to translate in a direction along the longitudinal axis;

a first axle mounted to the carriage and rotationally coupled to the first rail to rotate in proportion to a translational movement of the carriage in a direction along the longitudinal axis;

a first encoder coupled to the carriage to create a first position signal based on a rotational position of the first axle;

a first brake mechanism coupled to the carriage and to the first axle to selectively inhibit rotation of the first axle; and a controller linked to the first encoder and to the first brake mechanism to control the first brake mechanism in response to the first position signal;

wherein the first rail is relatively stiff in bending about a first bending axis and relatively flexible in bending about a second bending axis orthogonal to the first bending axis, and the first rail is releasably attached to a workpiece such that the first bending axis is substantially normal to a workpiece surface and the second bending axis is substantially parallel to the workpiece surface.

2. The device of claim 1, further comprising:
a plurality of rotary members coupled to the carriage to engage the first rail to moveably couple the carriage to the first rail.

3. The device of claim 1, further comprising at least one attachment device to releasably attach the first rail to a workpiece.

4. The device of claim 3, wherein the attachment device includes a plurality of vacuum cups coupled to the first rail to attach the first rail to a workpiece.

5. The device of claim 1, wherein the controller performs an algorithm using data regarding at least the first position signal corresponding to a first coordination hole and a second coordination hole to shift a predetermined data set with a known orientation with respect to the first and second coordination holes to correspond to an orientation of the first rail with respect to a workpiece.

6. The device of claim 1, wherein the controller is preprogrammed with a plurality of data sets and performs an algorithm using data regarding at least the first position signal corresponding to a first coordination hole and a second coordination hole to select a specific data set.

7. The device of claim 1, further comprising an input device mounted on the device and linked to the controller to receive user input.

8. The device of claim 1, wherein the controller is configured with a data set defining a plurality of predetermined locations where manufacturing processes are to be performed, and the controller is configured to control at least the first brake mechanism in order to successively fix an end-effector head in each of the predetermined locations so that the manufacturing processes can be performed.

9. The device of claim 8, further comprising a plurality of visual indicators mounted on the device to indicate a direction in which the device may be moved from its current location toward a next predetermined location.

10. The device of claim 1, further comprising:
a second rail moveably coupled to the carriage to translate with respect to the carriage in a direction of a longitudinal axis of the second rail;

a second axle mounted to the carriage and rotationally coupled to the second rail to rotate in proportion to a translational movement of the second rail in a direction along the longitudinal axis of the second rail;

a second encoder coupled to the carriage to create a second position signal based on a rotational position of the second axle; and a second brake mechanism coupled to the carriage and to the second axle to selectively inhibit rotation of the second axle;

wherein the controller also is linked to the second encoder and to the second brake mechanism and controls the second brake mechanism in response to the second position signal.

11. The device of claim 10, further comprising:
a first air-driven axial piston motor coupled to the carriage and to the first axle to propel the carriage; and a second air-driven axial piston motor coupled to the carriage and to the second axle to propel the second rail;

wherein the controller also is linked to the first and second axial piston motors and controls the first and second axial piston motors in response to the first and second position signals, respectively.

12. The device of claim 10, further comprising:
a plurality of evenly spaced slots laterally aligned along the first rail in the direction of the longitudinal axis of the first rail;

a plurality of evenly spaced slots laterally aligned along the second rail in the direction of the longitudinal axis of the second rail;

a first pinion gear coupled to the first axle to engage the slots on the first rail such that the first pinion gear rotates in proportion to the translation of the carriage with respect to the first rail; and a second pinion gear coupled to the second axle to engage the slots on the second rail such that the second pinion gear rotates in proportion to the translation of the second rail with respect to the carriage.

13. The device of claim 10, wherein the controller is configured to determine a first displacement between the carriage and a first predetermined position on the first rail and to modulate a first brake control signal in order to dynamically control a carriage velocity based on the first displacement, and to determine a second displacement between the carriage and a second predetermined position on the second rail and to modulate a second brake control signal in order to dynamically control a second rail velocity based on the second displacement.

14. The device of claim 10, wherein the controller is further configured to control a carriage acceleration and a second rail acceleration.

15. The device of claim 10, further comprising an end-effector head coupled to the second rail that translates with the second rail in the directions of the longitudinal axes of the first and second rails to carry a tool.

16. The device of claim 15, further comprising a drill coupled to the end-effector head.

17. The device of claim 15, further comprising a teach button to send a teach signal to the controller when the teach button is actuated, the teach signal indicating that the end-effector head is at a known distance from and a known orientation with respect to a coordination hole at a predetermined location on the workpiece.

18. The device of claim 15, further comprising:
a teach pin associated with the end-effector head to position the end-effector head at a known distance from and a known orientation with respect to a coordination hole at a predetermined location on the workpiece, the teach pin including:

a push rod end to facilitate manual depression of the teach pin; and a conical segment at an end opposite the push rod end to engage the coordination hole in order to axially align the teach pin with the coordination hole.

19. The device of claim 18, further comprising a position sensor to sense the position of the teach pin and send a teach signal to the controller when the teach pin is at a predetermined axial position, the teach signal indicating that the teach pin is aligned with the coordination hole.

20. The device of claim 15, further comprising a gravity compensator to compensate for an effect of the weight of the tool due to gravitational force.

21. The device of claim 15, further comprising:
a rail-mount rotatably coupled to the carriage to rotate with respect to the carriage around an axis normal to the longitudinal axes of the first and second rails;
a third encoder to create a third position signal corresponding to an angular position of the rail-mount; and
a third brake mechanism to inhibit rotation of the rail-mount;
wherein the second rail is moveably coupled to the rail-mount to translate with respect to the rail-mount in the direction of the longitudinal axis of the second rail, and the end-effector head further travels in an arc defined by a distance from the axis of rotation of the rail-mount to the end-effector head, and the controller also is linked to the third encoder and to the third brake mechanism and controls the third brake mechanism in response to the third position signal.

22. The device of claim 1, wherein the brake is concentrically attached to the axle.

23. A tool carrier, comprising:
means for carrying a tool;
means for moveably supporting the carrying means having a longitudinal axis along which the carrying means translates;
means for rotating mounted to the carrying means and rotationally coupled to the supporting means to rotate in proportion to a translational movement of the carrying means in a direction along the longitudinal axis;
means for sensing a rotational position of the rotating means to create a position signal;
means for braking coupled to the carrying means and to the rotating means to selectively inhibit rotation of the rotating means; and means for controlling linked to the sensing means and to the braking means to control the braking means in response to the position signal;
wherein the supporting means is relatively stiff in bending about a first bending axis and relatively flexible in bending about a second bending axis orthogonal to the first bending axis, and the supporting means is releasably attached to a workpiece such that the first bending axis is substantially normal to a workpiece surface and the second bending axis is substantially parallel to the workpiece surface.

24. A method of positioning a tool, comprising the steps of:
moveably supporting a carriage on a rail having a longitudinal axis along which the carriage translates;
sensing a rotational position of an axle that is mounted to the carnage and rotationally coupled to the rail to rotate in proportion to a translational movement of the carriage in a direction along the longitudinal axis;
creating a position signal based on the sensed rotational position of the axle;
controlling a first brake mechanism coupled to the carriage and to the axle in response to the position signal; and
selectively inhibiting rotation of the axle with the brake mechanism;
wherein the rail is relatively stiff in bending about a first bending axis and relatively flexible in bending about a second bending axis orthogonal to the first bending axis, and the rail is releasably attached to a workpiece such that the first bending axis is substantially normal to a workpiece surface and the second bending axis is substantially parallel to the workpiece surface.

25. The method of claim 24, further comprising the steps of:
sensing a position of a second rail with respect to the carriage;
controlling a second brake mechanism in response to the second rail position; and
selectively inhibiting movement of the second rail with the second brake mechanism.

* * * * *

UNITED STATES PATENT AND TRADEMARK OFFICE
CERTIFICATE OF CORRECTION

PATENT NO. : 7,112,018 B2  Page 1 of 1
APPLICATION NO. : 11/037377
DATED : September 26, 2006
INVENTOR(S) : Theodore M. Boyl-Davis et al.

It is certified that error appears in the above-identified patent and that said Letters Patent is hereby corrected as shown below:

Column 12, Line 4
Please replace "carnage" with --carriage--;

Column 12, Line 47
Please replace "carnage" with --carriage--;

Column 14, Line 17
Please replace "carnage" with --carriage--.

Signed and Sealed this

Twelfth Day of December, 2006

JON W. DUDAS
*Director of the United States Patent and Trademark Office*